(12) United States Patent
Wang et al.

(10) Patent No.: US 7,898,801 B2
(45) Date of Patent: Mar. 1, 2011

(54) PORTABLE ELECTRONIC DEVICE

(75) Inventors: Ying-Zhuo Wang, Shenzhen (CN);
Hsiao-Hua Tu, Taipei Hsien (TW);
Gang Yang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 64 days.

(21) Appl. No.: 12/477,217

(22) Filed: Jun. 3, 2009

(65) Prior Publication Data

US 2010/0142130 A1  Jun. 10, 2010

(30) Foreign Application Priority Data

Dec. 8, 2008  (CN) .......................... 2008 1 0306047

(51) Int. Cl.
*G06F 1/16*  (2006.01)

(52) U.S. Cl. .................. 361/679.59; 248/168; 455/575.1

(58) Field of Classification Search ............. 361/679.01, 361/679.59; 248/168, 222.51; 345/173; 455/575.1, 575.8; 348/372–376
See application file for complete search history.

(56) References Cited

U.S. PATENT DOCUMENTS

| | | | | |
|---|---|---|---|---|
| 5,375,076 A | * | 12/1994 | Goodrich et al. | 361/679.17 |
| 6,016,248 A | * | 1/2000 | Anzai et al. | 361/679.59 |
| 6,768,635 B2 | * | 7/2004 | Lai et al. | 361/679.11 |
| 6,975,507 B2 | * | 12/2005 | Wang et al. | 361/679.21 |
| 7,206,196 B2 | * | 4/2007 | Ghosh et al. | 361/679.09 |
| 2005/0052831 A1 | * | 3/2005 | Chen | 361/680 |
| 2009/0261216 A1 | * | 10/2009 | Yang et al. | 248/168 |
| 2010/0002129 A1 | * | 1/2010 | Zhou | 348/374 |

* cited by examiner

*Primary Examiner* — Lisa Lea-Edmonds
(74) *Attorney, Agent, or Firm* — Steven M. Reiss

(57) ABSTRACT

A free-standing portable electronic device is described. The portable electronic device includes a cover member, a body member and a support assembly rotatably mounted to the cover member and is used to stand the personal electronic device in an upright manner.

20 Claims, 7 Drawing Sheets ial Field
PORTABLE ELECTRONIC DEVICE

BACKGROUND

1. Technical Field

The present disclosure relates to portable electronic devices and, particularly, to a portable electronic device with a free-standing supportability.

2. Description of Related Art

Many portable electronic devices, e.g., mobile phones and personal digital assistants, are equipped with a video playing function. Due to their small size, a portable electronic device cannot be stably stood upright on a flat surface. Therefore, it is difficult to watch video images. In such case, users need to hold a portable electronic device in their hands to watch video image. However, the video image may shake and become blurry when users manually hold the portable electronic device. In addition, users may become tired if they are holding a portable electronic device for a long time.

Therefore, there is room for improvement within the art.

BRIEF DESCRIPTION OF THE DRAWINGS

Many aspects of the portable electronic device can be better understood with reference to the following drawings. These drawings are not necessarily drawn to scale, the emphasis instead being placed upon clearly illustrating the principles of the present portable electronic device. Moreover, in the drawings like reference numerals designate corresponding sections throughout the several views.

DETAILED DESCRIPTION

Figure 1:
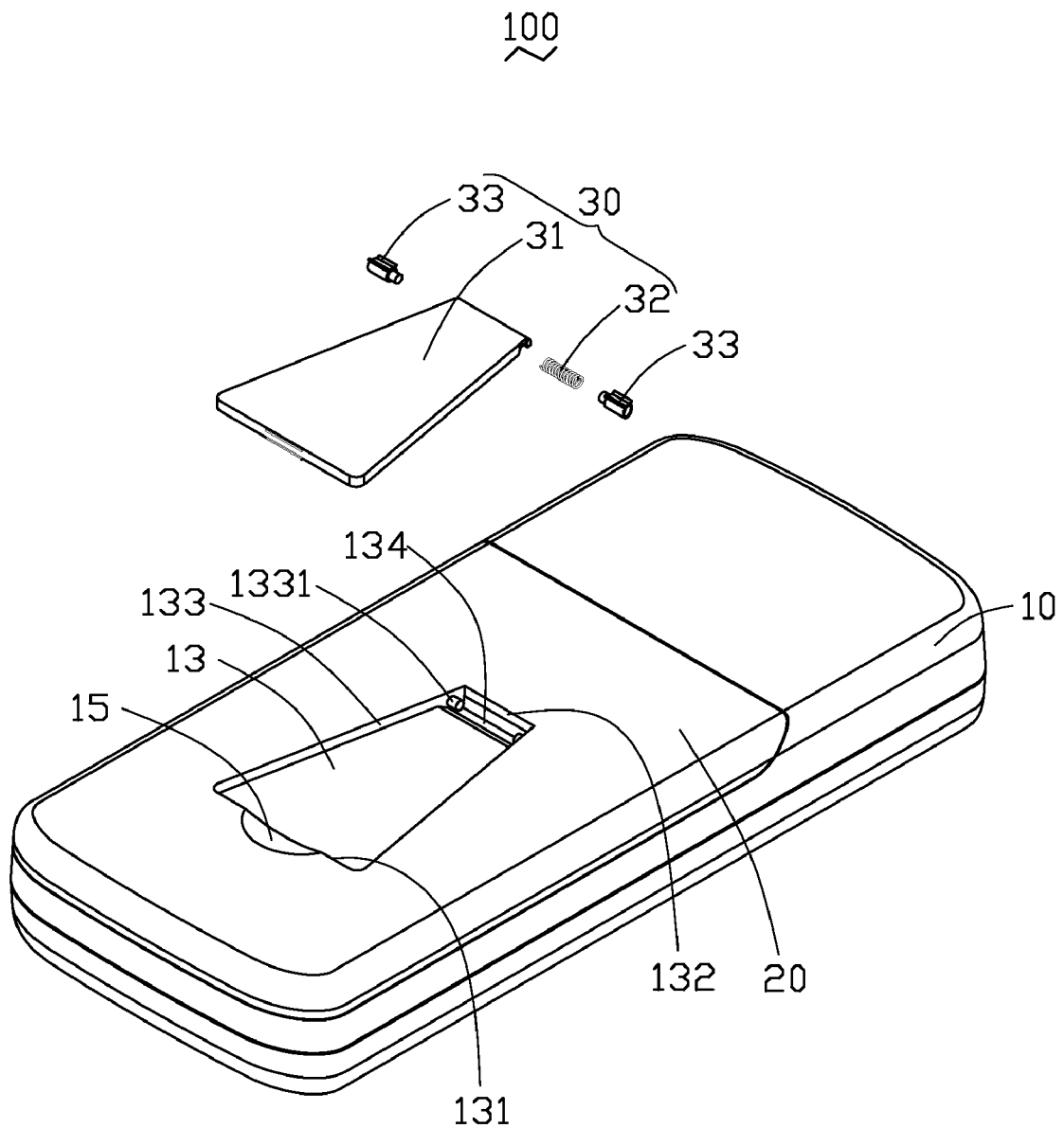
FIG. 1 is an exploded, isometric view of the portable electronic device in accordance with an exemplary embodiment.
Figure 3:
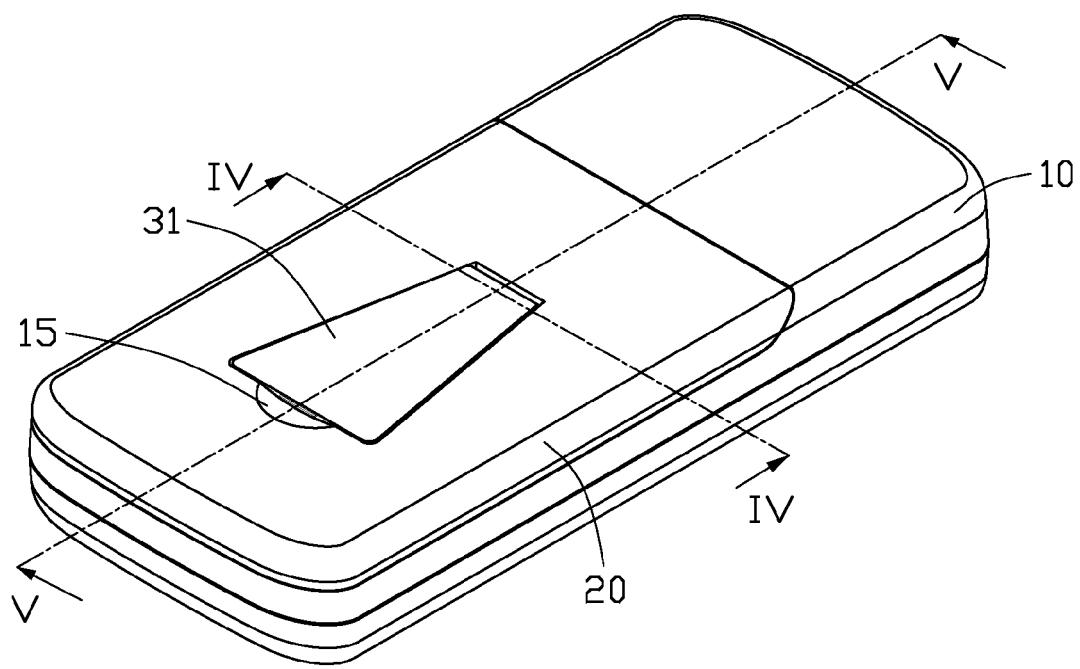
FIG. 3 is an assembled, isometric view of the portable electronic device shown in FIG. 1.
Figure 4:
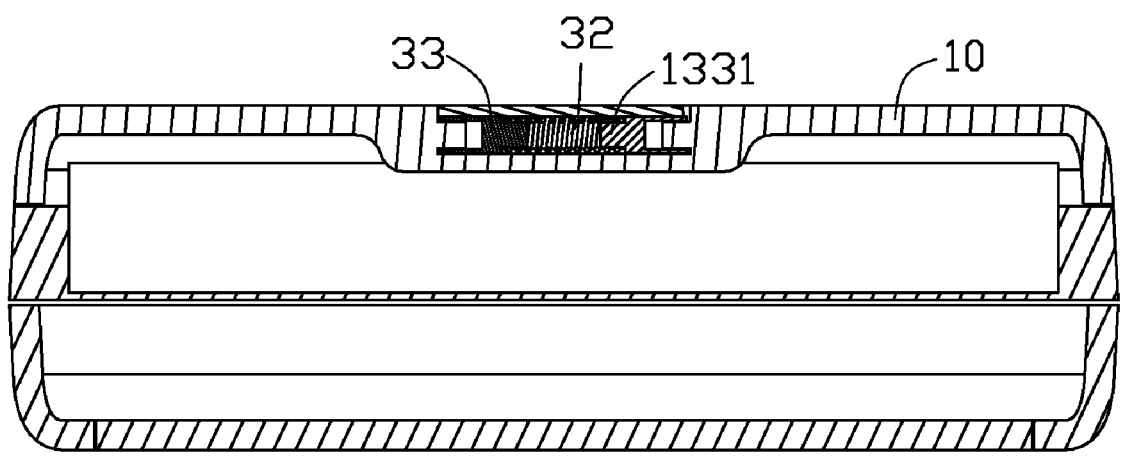
FIG. 4 is a cross-sectional view of the portable electronic device shown in FIG. 3 taken along line IV-IV.
Figure 5:
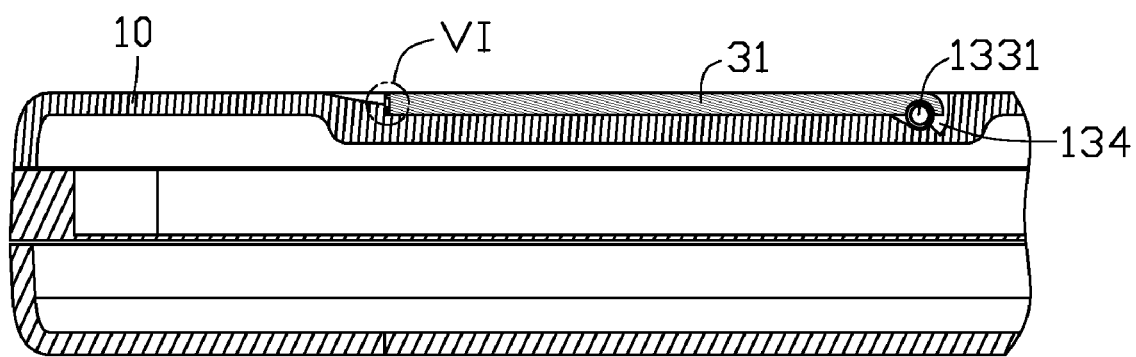
FIG. 5 is a cross-sectional view of the portable electronic device shown in FIG. 3 taken along line V-V.

The exemplary portable electronic device 100 shown in FIGS. 1, 3 and 5 may be a mobile phone, a personal digital assistant (PDA), etc. The portable electronic device 100 includes a body member 10, a cover member 20 and a support assembly 30. The cover member 20 is mounted to the body member 10. The support assembly 30 is mounted to the cover member 20.

Figure 6:
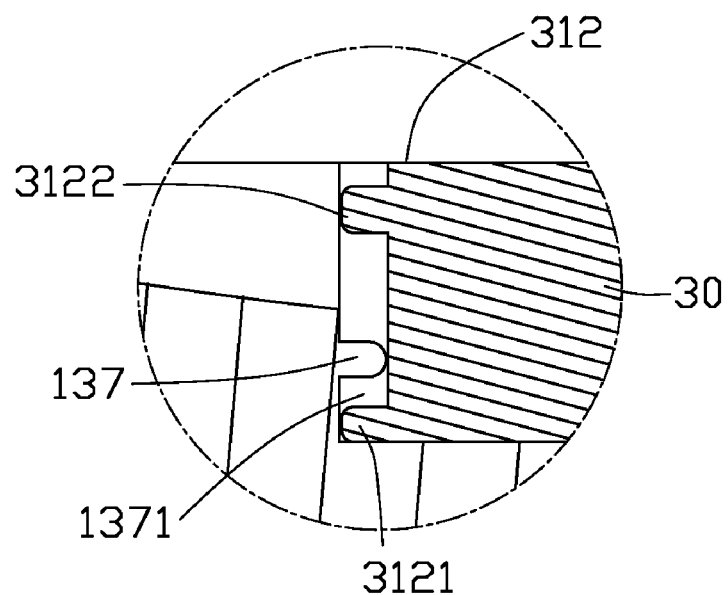
FIG. 6 is an enlarged view of the portable electronic device shown in FIG. 5.
Figure 7:
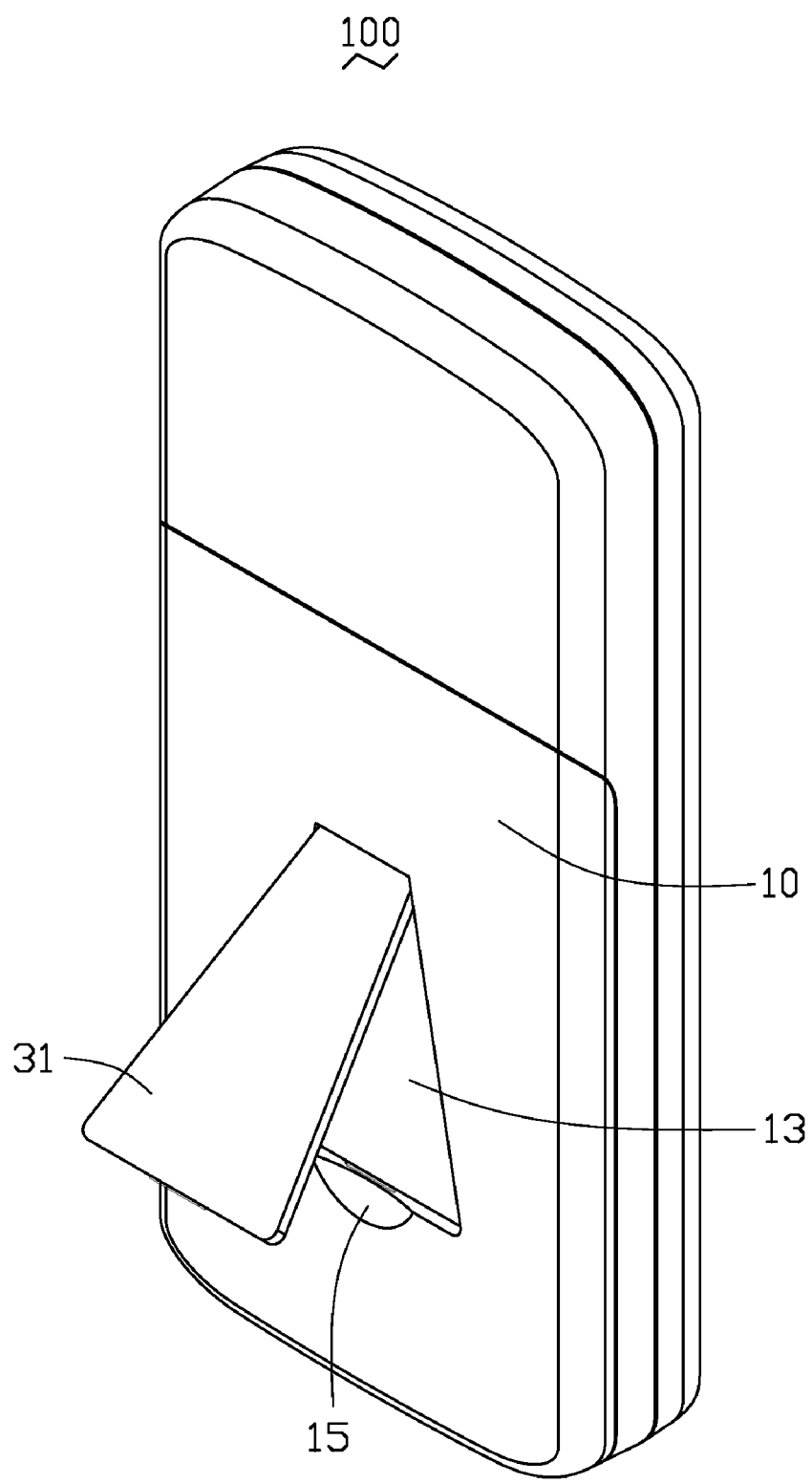
FIG. 7 is an isometric view of the portable electronic device shown in FIG. 3 when the support assembly is opened.

The cover member 20 may be a battery cover and mounted to the body member 10 by a typical means e.g., elastic latching means. The cover member 20 defines a receiving space 13 used to receive the support assembly 30 therein. The receiving space 13 is enclosed by a first wall 131, a second wall 132 opposite to the first wall 131, and two opposite side walls 133. Each side walls 133 has a symmetric pivoting column 1331 protruding therefrom adjacent to the second wall 132. The two symmetric pivoting columns 1331 are coaxial and face each other. A bottom wall of the receiving space 13 further defines a latching slot 134 adjacent to the pivoting columns 1331. The latching slot 134 can be V-shaped (see FIG. 5). The latching slot 134 is configured to allow the support assembly 30 to rotate to a predetermined angle. A protrusion 137 protrudes from the first wall 131, thus forming a clamping slot 1371 between the protrusion 137 and the bottom wall of the receiving space 13 (best seen in FIG. 6). The cover member 20 further defines an operation slot 15 adjacent to the first wall 131. The operation slot 15 is used to facilitate a user's access to the support assembly 30 when it is received in the receiving space 13.

Figure 2:
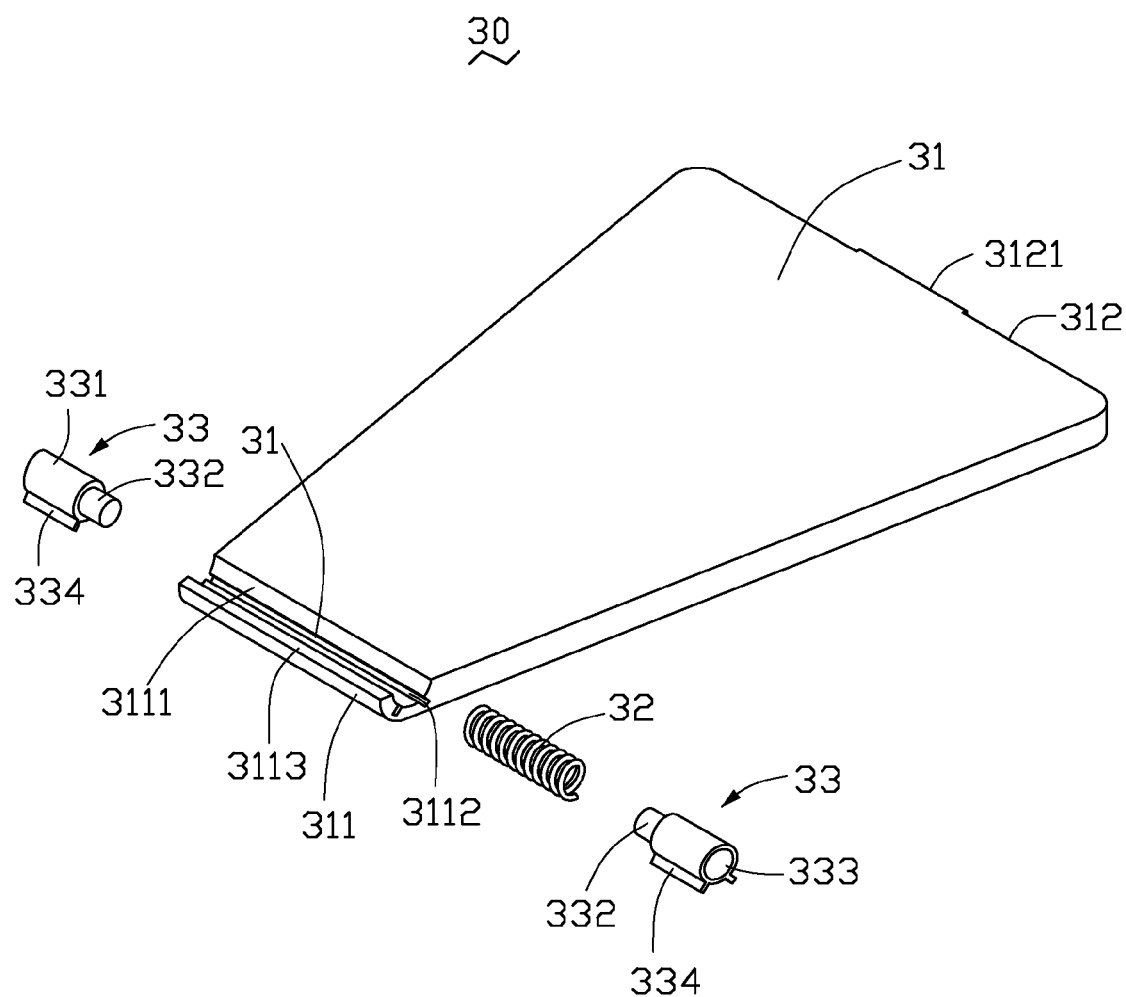
FIG. 2 is an exploded, isometric view of the support assembly shown in FIG. 1.

Referring to FIG. 2, the support assembly 30 includes a support board 31, an elastic member 32 and two connecting sleeves 33. The support board 31 is configured to be received in the receiving space 13. The support board 31 includes a first end 311 and a second end 312 parallel and opposite to the first end 311. The support board 31 includes a mounting cavity 3111 adjacent to the first end 311, and a latching portion 3113. In this exemplary embodiment, the mounting cavity 3111 has a semicircular cross-section. A bottom wall of the mounting cavity 3111 defines two mounting slits 3112 perpendicular with the cross-section of the mounting cavity 3111. The latching portion 3113 is used to latch into the latching slot 134. The connecting sleeve 33 includes a main portion 331, a connecting block 332 protruding from an end surface of the main portion 331, and a pivoting cavity 333 defined on the other end surface of the main portion 331. The connecting sleeves 33 further define two mounting ribs 334 protruding from a peripheral wall of the main portion 331 corresponding to the mounting slits 3112. The mounting ribs 334 are slidably received in the corresponding mounting slits 3112 so that the two connecting sleeves 33 are slidably mounted to the support board 31 with the connecting blocks 332 facing each other. The elastic member 32 is a coil spring received in the mounting cavity 3111 and sandwiched between the two connecting sleeves 33. The connecting block 332 of one connecting sleeve 33 is received into an end of the elastic member 32, and the connecting block 332 of the other connecting sleeve 33 is received into the other end of the elastic member 32. The second end 312 has a clamp 3121 protruding from the middle portion. The clamp 3121 latches into the clamping slot 1371 to latch the support assembly 30 to the cover member 20 (see FIG. 6). An operation bar 3122 (see FIG. 6) also protrudes from the second end 312 corresponding to the operation slot 15. The operation bar 3122 is exposed in the operation slot 15 and allows easy user access to the operation slot 15.

Referring to FIG. 3 together, in assembly, the two connecting sleeves 33 are pushed towards each other, compressing the elastic member 32. Then the first end 311 with the two connecting sleeves 33 and the elastic member 32 is inserted into the receiving space 13 and the pivoting cavities 333 are aligned with the pivoting columns 1331. At this time, the connecting sleeves 33 are released and the elastic member 32 repells the connecting sleeves 33 to slide towards the pivoting columns 1331 until the pivoting columns 1331 are rotatably received in the corresponding pivoting cavities 333. Then, the support board 31 is rotated around the pivoting columns 1331 towards the cover member 20 until the clamp 3121 latches into the clamping slot 1371. At this time, the support assembly 30 have been retracted and received in the cover member 20.

Referring to FIG. 4 to FIG. 7, in use, a user can access the operation bar 3122 of the support board 31 by the operation slot 15 to make the clamp 3121 go over the protrusion 137 and out of the clamping slot 1371. Then the support board 31 is rotated around the pivoting columns 1331 until the latching portion 3113 latches into the latching slot 134. At this time, the latching portion 3113 abuts against a bottom wall of the latching slot 134 and the support board 31 can stably support the portable electronic device 100 upright. Thus, a user can easily enjoy the video images of the portable electronic device 100 without holding the portable electronic device 100 in his/her hands.

In alternative embodiments, the number of the mounting slits 3112 may be greater than two, and correspond to the number of mounting ribs.

In further alternative embodiments, a cavity can be defined on an end surface of the connecting sleeves 33 instead of the connecting block 332. An end of the elastic member 32 is received in the hole.

It is to be understood that the shape of the latching slot 134 can be changed to allow the support board 31 rotate for different angles.

It is to be understood that the latching slot 132 can be defined on different portions of the cover member 20.

In other alternative embodiments, the support assembly 30 may be directly mounted to the body member 10.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A portable electronic device, comprising:
a cover member;
a body member, the cover member being mounted to the body member;
a support assembly rotatably mounted to the cover member, the support assembly including a support board, an elastic member and two connecting sleeves, the two connecting sleeves being slidably mounted to the support board and compressing the elastic member therebetween, the two connecting sleeves being rotatably connected to the cover member.

2. The portable electronic device as claimed in claim 1, wherein the support board includes a first end and an opposite second end.

3. The portable electronic device as claimed in claim 2, wherein the support board defines at least one mounting slit adjacent to the first end, at least one corresponding mounting rib protruding from a peripheral wall of each connecting sleeve, the mounting rib is slidably received in the mounting slit.

4. The portable electronic device as claimed in claim 1, wherein the support board defines a mounting cavity, the elastic member and the two connecting sleeves are received in the mounting cavity.

5. The portable electronic device as claimed in claim 1, wherein the connecting sleeve includes a main portion, a connecting block protrudes from an end surface of the main portion, the connecting block is received in one end of the elastic member.

6. The portable electronic device as claimed in claim 5, wherein a pivoting cavity is defined on the other end surface of the main portion of each connecting sleeve, the cover member arranges two pivoting columns, the pivoting columns being rotatably received in the pivoting cavities.

7. The portable electronic device as claimed in claim 6, wherein the cover member defines a receiving space, the receiving space is used to receive the support board.

8. The portable electronic device as claimed in claim 7, wherein a bottom wall of the receiving space further defines a latching slot adjacent to the pivoting columns, the latching slot is configured to allow the support board to rotate for a predetermined angle.

9. The portable electronic device as claimed in claim 7, wherein the cover member further defines an operation slot adjacent to the receiving space, the operation slot is used to facilitate users to catch the support board received in the receiving space.

10. The portable electronic device as claimed in claim 7, wherein a protrusion protrudes from a first wall of the receiving space, thus forming a clamping slot between the protrusion and a bottom wall of the receiving space, a clamping portion protrudes from the support board, the clamping portion latches into the clamping slot.

11. A support assembly used to support a portable electronic device, the portable electronic device including a body member and a cover member mounted to the body member, the support assembly comprising:
a support board;
an elastic member; and
two connecting sleeves, the two connecting sleeves being slidably mounted to the support board and compressing the elastic member therebetween, the two connecting sleeves being rotatably connected to the cover member.

12. The support assembly as claimed in claim 11, wherein the support board includes a first end and an opposite second end.

13. The support assembly as claimed in claim 12, wherein the support board defines at least mounting slits adjacent to the first end, at least corresponding mounting ribs protruding from a peripheral wall of each connecting sleeve, the mounting ribs are slidably received in the mounting slits.

14. The support assembly as claimed in claim 11, wherein the support board defines a mounting cavity, the elastic member and the two connecting sleeve are received in the mounting cavity.

15. The support assembly as claimed in claim 11, wherein the connecting sleeve includes a main portion, a connecting block protrudes from an end surface of the main portion, the connecting block is received in one end of the elastic member.

16. The support assembly as claimed in claim 15, wherein a pivoting cavity is defined on the other end surface of the main portion of each connecting sleeve, the cover member arranges two pivoting columns, the pivoting columns being rotatably received in the pivoting cavities.

17. The support assembly as claimed in claim 16, wherein the cover member defines a receiving space, the receiving space is used to receive the support board.

18. The support assembly as claimed in claim 17, wherein a bottom wall of the receiving space further defines a latching slot adjacent to the pivoting columns, the latching slot is configured to allow the support board to rotate for a predetermined angle.

19. The support assembly as claimed in claim 17, wherein the cover member further defines an operation slot adjacent to the receiving space, the operation slot is used to facilitate users to catch the support board received in the receiving space.

20. The support assembly as claimed in claim 17, wherein a protrusion protrudes from a first wall of the receiving space, thus forming a clamping slot between the protrusion and a bottom wall of the receiving space, a clamping portion protrudes from the support board, the clamping portion latches into the clamping slot.

* * * * *